US011015471B2

(12) United States Patent
Wilber

(10) Patent No.: US 11,015,471 B2
(45) Date of Patent: May 25, 2021

(54) CLAMPING SEAL FOR JET ENGINE MID-TURBINE FRAME

(71) Applicant: United Technologies Corporation, Farmington, CT (US)

(72) Inventor: John Wilber, Marlborough, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 89 days.

(21) Appl. No.: 16/509,245

(22) Filed: Jul. 11, 2019

(65) Prior Publication Data

US 2019/0330994 A1 Oct. 31, 2019

Related U.S. Application Data

(60) Division of application No. 15/096,656, which is a continuation of application No. (Continued)

(51) Int. Cl.
*F01D 11/00* (2006.01)
*F01D 9/04* (2006.01)
(Continued)

(52) U.S. Cl.
CPC ............ *F01D 11/006* (2013.01); *F01D 9/04* (2013.01); *F01D 9/041* (2013.01); *F01D 9/06* (2013.01);
(Continued)

(58) Field of Classification Search
CPC .......... F01D 11/006; F01D 9/04; F01D 9/041; F01D 9/06; F01D 11/003; F01D 11/005; F02C 7/28
See application file for complete search history.

(56) References Cited

U.S. PATENT DOCUMENTS 2,472,062 A * 6/1949 Boestad ................ F01D 25/246
415/139
3,034,298 A 5/1962 White
(Continued)

FOREIGN PATENT DOCUMENTS

DE 102009044103 6/2010
EP 0147354 7/1985
(Continued)

OTHER PUBLICATIONS

European Patent Office, Supplementary European Search Report dated Feb. 26, 2018 in Application No. 14877712.1-1006.
(Continued)

*Primary Examiner* — Aaron R Eastman
(74) *Attorney, Agent, or Firm* — Snell & Wilmer L.L.P.

(57) ABSTRACT

A mid-turbine frame (MTF") for a jet engine is disclosed and comprises a duct that extends between a high pressure jet engine turbine ("HPT") and a low pressure jet engine turbine ("LPT"), the duct comprising a plurality of segments that together form an outer annular structure and an inner annular structure, the inner annular structure situated radially inward of the outer annular structure, and/or a plurality of vanes that extend radially outward from the inner annular structure toward the outer annular structure, each vane comprising a channel. Each segment may be coupled to an adjacent segment by a seal.

4 Claims, 7 Drawing Sheets

Related U.S. Application Data

PCT/US2014/071190, filed on Dec. 18, 2014, now Pat. No. 10,392,954.

(60) Provisional application No. 61/925,001, filed on Jan. 8, 2014.

(51) Int. Cl.
*F01D 9/06* (2006.01)
*F02C 7/28* (2006.01)

(52) U.S. Cl.
CPC .......... *F01D 11/003* (2013.01); *F01D 11/005* (2013.01); *F02C 7/28* (2013.01)

(56) References Cited

U.S. PATENT DOCUMENTS

| | | | |
|---|---|---|---|
| 3,628,880 | A | 12/1971 | Smuland et al. |
| 4,013,376 | A | 3/1977 | Bisson et al. |
| 4,177,004 | A | 12/1979 | Reidmiller et al. |
| 4,524,980 | A | 6/1985 | Lillibridge et al. |
| 4,748,806 | A | 6/1988 | Drobny |
| 4,920,741 | A | 5/1990 | Liebl |
| 4,920,742 | A | 5/1990 | Nash et al. |
| 4,987,736 | A | 1/1991 | Ciokajlo |
| 5,088,888 | A | 2/1992 | Bobo |
| 5,219,255 | A | 6/1993 | Hussain et al. |
| 5,292,227 | A | 3/1994 | Czachor |
| 5,344,283 | A | 9/1994 | Magowan et al. |
| 5,423,659 | A | 6/1995 | Thompson |
| 5,634,766 | A | 6/1997 | Cunha et al. |
| 5,743,708 | A | 4/1998 | Cunha et al. |
| 5,975,844 | A | 11/1999 | Milazar et al. |
| 6,203,025 | B1 | 3/2001 | Hayton |
| 6,261,053 | B1 | 7/2001 | Anderson |
| 6,702,549 | B2 | 3/2004 | Tiemann |
| 6,705,832 | B2 | 3/2004 | Tiemann |
| 8,069,648 | B2 | 12/2011 | Snyder |
| 8,356,981 | B2 | 1/2013 | Cooke et al. |
| 8,359,866 | B2 | 1/2013 | Dierberger |
| 8,490,399 | B2 | 7/2013 | Nordlund |
| 8,500,392 | B2 | 8/2013 | Durocher |
| 9,534,783 | B2 | 1/2017 | Dierberger |
| 9,808,889 | B2 | 11/2017 | Mitchell |
| 2003/0068225 | A1* | 4/2003 | Housley .............. F01D 9/04 415/189 |
| 2004/0168443 | A1 | 9/2004 | Moniz et al. |
| 2005/0008473 | A1 | 1/2005 | Balsdon |
| 2005/0025617 | A1 | 2/2005 | Suzuki et al. |
| 2005/0082768 | A1 | 4/2005 | Iguchi et al. |
| 2006/0082074 | A1 | 4/2006 | Synnott et al. |
| 2007/0158919 | A1 | 7/2007 | Bennett |
| 2007/0210536 | A1 | 9/2007 | Paauwe |
| 2009/0004023 | A1 | 1/2009 | Dejaune et al. |
| 2009/0169369 | A1 | 7/2009 | Morgan et al. |
| 2010/0040462 | A1 | 2/2010 | Praisner et al. |
| 2010/0129211 | A1 | 5/2010 | Hart et al. |
| 2010/0132374 | A1 | 6/2010 | Manteiga et al. |
| 2010/0135770 | A1 | 6/2010 | Durocher et al. |
| 2010/0266386 | A1 | 10/2010 | Broomer et al. |
| 2010/0307165 | A1* | 12/2010 | Wong .............. F01D 25/162 60/796 |
| 2010/0319352 | A1 | 12/2010 | Hernandez Russe et al. |
| 2011/0002778 | A1* | 1/2011 | Strom .............. F01D 9/04 415/182.1 |
| 2011/0041509 | A1 | 2/2011 | Thompson, Jr. et al. |
| 2011/0081237 | A1 | 4/2011 | Durocher et al. |
| 2011/0085895 | A1 | 4/2011 | Durocher et al. |
| 2011/0185740 | A1* | 8/2011 | Dierberger .............. F23M 5/04 60/755 |
| 2012/0274034 | A1 | 11/2012 | Bouchard et al. |
| 2013/0019603 | A1* | 1/2013 | Dierberger .............. F23R 3/06 60/772 |
| 2013/0084166 | A1 | 4/2013 | Klingels |
| 2013/0259672 | A1 | 10/2013 | Suciu et al. |
| 2014/0023490 | A1* | 1/2014 | Hillier .............. F01D 11/005 415/173.6 |
| 2014/0109590 | A1 | 4/2014 | Casabant |
| 2016/0024949 | A1* | 1/2016 | Wilber .............. F01D 9/02 60/805 |
| 2016/0215644 | A1 | 7/2016 | Snyder et al. |
| 2016/0258309 | A1 | 9/2016 | Wilber |
| 2016/0281524 | A1 | 9/2016 | Wilber |
| 2017/0044932 | A1 | 2/2017 | Wilber |

FOREIGN PATENT DOCUMENTS

| | | |
|---|---|---|
| EP | 2192276 | 6/2010 |
| GB | 2455899 | 7/2009 |
| WO | 2009116898 | 9/2009 |
| WO | 2010002296 | 1/2010 |

OTHER PUBLICATIONS

International Preliminary Report on Patentability dated Jul. 12, 2016 in Application No. PCT/US2014/071190.
International Search Report and Written Opinion dated May 29, 2015 in Application No. PCT/US2014/071190.
Partial Supplementary Search Report dated Nov. 13, 2017 in EP Application No. 14877712.1.
USPTO Requirement for Restriction dated Oct. 15, 2018 in U.S. Appl. No. 15/096,656.
USPTO Non Final Office Action dated Jan. 18, 2019 in U.S. Appl. No. 15/096,656.
USPTO Final Office Action dated May 15, 2019 in U.S. Appl. No. 15/096,656.
USPTO Notice of Allowance dated Jun. 5, 2019 in U.S. Appl. No. 15/096,656.
International Search Report and Written Opinion dated Apr. 14, 2015 in Application No. PCT/US2015/12656.
International Search Report and Written Opinion dated Oct. 5, 2015 in Application No. PCT/US2015/12651.
International Search Report and Written Opinion dated Jun. 25, 2015 in Application No. PCT/US2015/12664.
Supplementary European Search Report dated Feb. 8, 2017 in Application No. 15777268.2-1610.
USPTO Final Office Action dated Jun. 13, 2019 in U.S. Appl. No. 15/032,017.
USPTO Notice of Non Responsive Amendment dated Jan. 29, 2019 in U.S. Appl. No. 15/032,017.
USPTO Non Final Office Action dated Aug. 28, 2018 n U.S. Appl. No. 15/032,017.
Supplementary European Search Report dated Jan. 23, 2017 in Application No. 15743660.1-1610.
USPTO Notice of Allowance dated Mar. 28, 2019 in U.S. Appl. No. 15/032,019.
USPTO Advisory Action dated Feb. 4, 2019 in U.S. Appl. No. 15/032,019.
USPTO Final Office Action dated Nov. 28, 2018 in U.S. Appl. No. 15/032,019.
USPTO Non Final Office action dated Jun. 28, 2018 in U.S. Appl. No. 15/032,019.
Supplementary European Search Report dated Mar. 9, 2018 in Application No. 15743890.4-1006.
USPTO Notice of Allowance dated Feb. 13, 2019 in U.S. Appl. No. 15/032,024.
USPTO Office Action dated Aug. 16, 2018 in U.S. Appl. No. 15/032,024.
EP Partial Supplementary Search Report dated Oct. 24, 2017 in EP Application No. 15743890.4.
International Preliminary Report on Patentability dated Aug. 2, 2016 in Application No. PCT/US2015/012651.
European Patent Office, European Search Report dated Jul. 22, 2019 in Application No. 19166504.1.

\* cited by examiner

CLAMPING SEAL FOR JET ENGINE MID-TURBINE FRAME

CROSS-REFERENCE TO RELATED APPLICATIONS

This application is a divisional of, claims priority to and the benefit of, U.S. application Ser. No. 15/096,656 filed on Apr. 12, 2016 and entitled "CLAMPING SEAL FOR JET ENGINE MID-TURBINE FRAME," which claims priority from PCT/US2014/071190 filed on Dec. 18, 2014 and entitled "CLAMPING SEAL FOR JET ENGINE MID-TURBINE FRAME," which claims priority from U.S. Provisional Application No. 61/925,001 filed on Jan. 8, 2014 and entitled "CLAMPING SEAL FOR JET ENGINE MID-TURBINE FRAME." All the aforementioned applications are incorporated herein by reference in their entirety.

FIELD

The present disclosure relates to a seal for a jet engine mid-turbine frame, and more particularly, to a clamping seal for a jet engine mid-turbine frame vane segment.

BACKGROUND

Gas turbine engines (e.g., jet engines) generally include a compressor to pressurize inflowing air, a combustor to burn a fuel in the presence of the pressurized air, and a turbine to extract energy from the resulting combustion gases. The compressor may comprise a low pressure compressor, as well as a high pressure compressor. The turbine may likewise comprise a high pressure turbine and a low pressure turbine.

SUMMARY

A mid-turbine frame ("MTF") for a jet engine is disclosed and comprises a duct that extends between a high pressure jet engine turbine ("HPT") and a low pressure jet engine turbine ("LPT"), the duct comprising a plurality of segments that together form an outer annular structure and an inner annular structure, the inner annular structure situated radially inward of the outer annular structure, and/or a plurality of vanes that extend radially outward from the inner annular structure toward the outer annular structure, each vane comprising a channel. Each segment may be coupled to an adjacent segment by a seal. Each segment may include a plurality of channels that extend axially along an axial length of each segment. Each segment of the outer annular structure may include a first tenon that defines a first axial terminus of each segment and a second tenon that defines a second axial terminus of each segment. Each segment of the inner annular structure may include a first tenon that defines a first axial terminus of each segment and a second tenon that defines a second axial terminus of each segment. A first tenon may be joined to a second tenon by a seal that clamps the first tenon and the second tenon together. The duct may define a hot gas path between the HPT and the LPT. The MTF may further comprise a perforated structure that is disposed radially outward of the outer annular structure. Each of a plurality of perforations in the perforated structure may be configured to permit cooling air to flow into and over the outer annular structure. The MTF may further comprise a slot that extends between a channel formed in a first segment and a seal that clamps a second segment to the first segment. The slot may be configured to relay cooling air through the seal and into a hot gas path within the duct. The MTF may further comprise a seal that includes a tortuous gutter that is configured to permit cooling air to flow into a hot gas path within the duct. The tortuous gutter may comprise a narrow passage between a first member of the seal, a tenon, and a perforated structure, which collectively form a passage through which air may flow.

A seal for clamping a first segment of a MTF to a second segment of the MTF is disclosed. The seal may comprise a first member configured to be coupled to a radially outward portion of a first segment that forms a portion of an annular structure, and/or a second member configured to be coupled to a radially inward portion of the first segment, the second member comprising a plurality of radially extending members that extend radially outward through the first member. The seal may further comprise a tortuous gutter, the tortuous gutter comprising a narrow passage formed between one of the plurality of radially extending members, a tenon, and a perforated structure. The seal may be configured to permit cooling air to flow into a hot gas path formed within a duct. The tortuous gutter may be configured to permit cooling air to flow into a hot gas path formed within a duct.

A MTF of a jet engine is disclosed. The MTF may comprise an inner annular structure, an outer annular structure situated concentrically about the inner annular structure, and/or a plurality of vanes, each vane extending radially outward from the inner annular structure toward the outer annular structure. The plurality of vanes may comprise hollow channels.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

As used herein, "aft" refers to the direction associated with the tail (e.g., the back end) of an aircraft, or generally, to the direction of exhaust of the gas turbine. As used herein, "forward" refers to the directed associated with the nose (e.g., the front end) of an aircraft, or generally, to the direction of flight or motion. For example, with reference to FIG. 1, central axis A-A' may be described as extending from a forward position (A) to an aft position (A').

Figure 1:
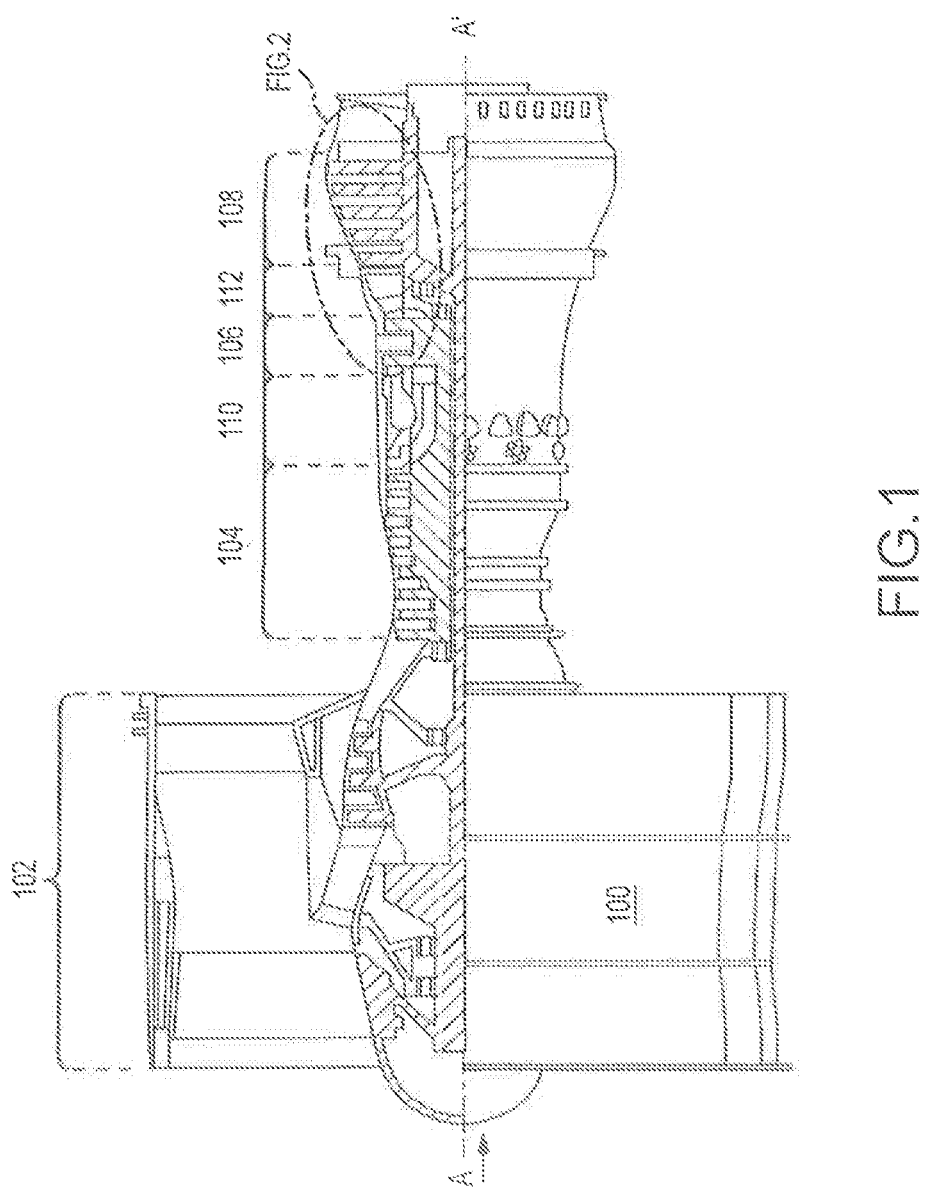
FIG. 1 illustrates, in accordance with various embodiments, a cutaway view of a jet engine.

With continued reference now to FIG. 1, gas turbine engines (e.g., jet engines) 100 may extend from forward to aft along a central axis A-A'. As described above, gas turbine engines 100 generally include a compressor to pressurize inflowing air, a combustor to burn a fuel in the presence of the pressurized air, and a turbine to extract energy from the resulting combustion gases. The compressor may be divided into two sections. Specifically, the compressor may comprise a low pressure compressor 102 situated forward of a high pressure compressor 104. The turbine may likewise be divided into two sections. These include a high pressure turbine (or "HPT") 106 situated forward of a low pressure turbine (or "LPT") 108. The combustor 110 may be disposed axially aft of the HPT 106 and axially forward of the LPT 108.

Figure 2:
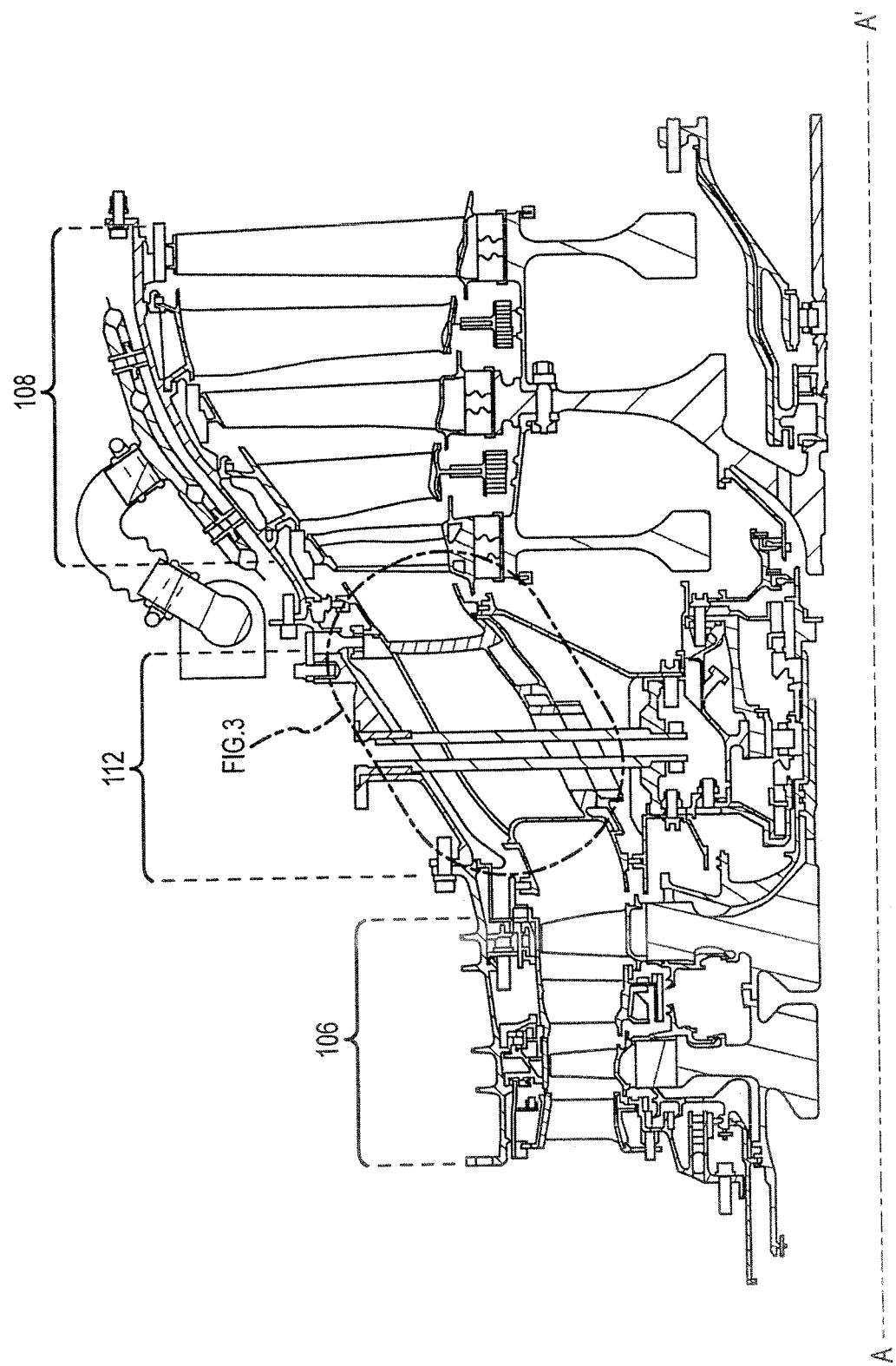
FIG. 2 illustrates, in accordance with various embodiments, a cross-sectional view of portion of a jet engine turbine.

In various embodiments, a structure, which may be referred to herein as a "mid-turbine frame" or "MTF" 112 may be included as part of the gas turbine engine 100. More particularly, as shown with respect to FIG. 2, the MTF 112 may be disposed aft of the HPT 106 and forward of the LPT 108. The MTF 112 may generally comprise a duct configured to convey (hot) combustion gasses from the HPT 106 to the LPT 108. The MTF 112 may thus comprise an annular and/or semi-annular duct configured, in particular, to permit the expansion of hot gasses exiting the HPT 106 into the LPT 108. The MTF 112 may enlarge in diameter as it extends from forward to aft along the axis A-A'.

Figure 3:
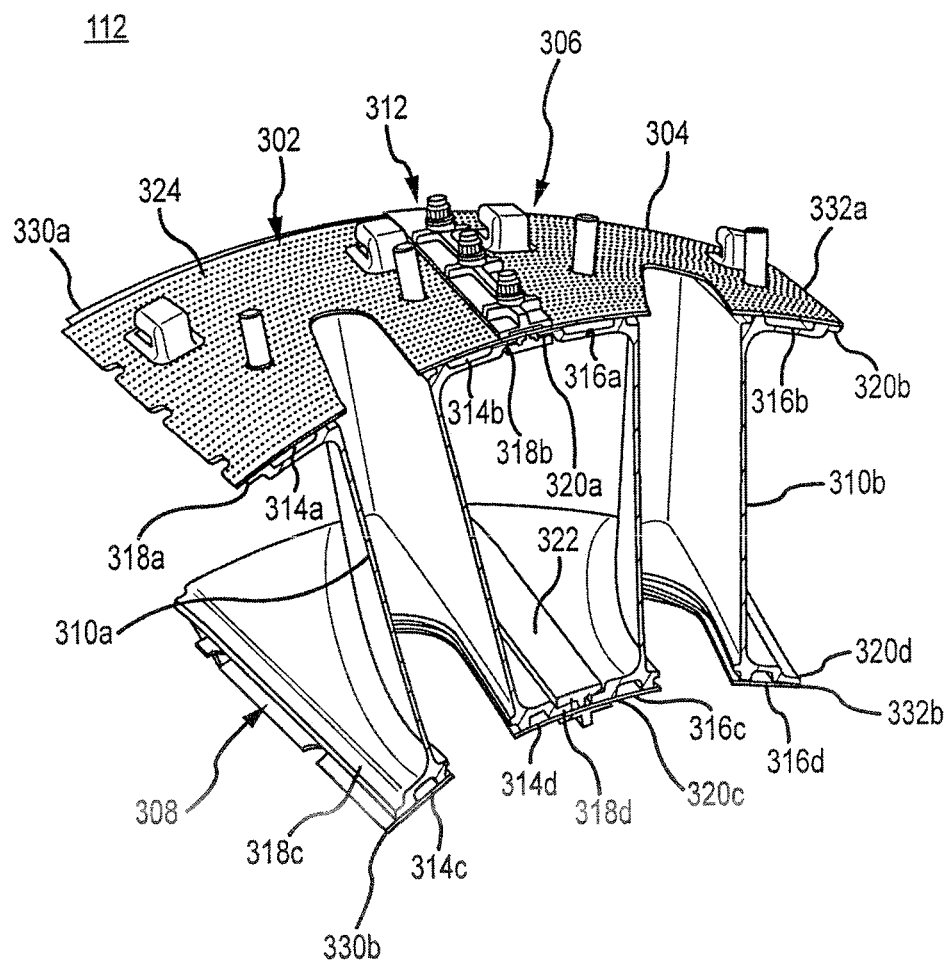
FIG. 3 illustrates, in accordance with various embodiments, a cutaway view of a MTF.

With reference to FIG. 3, the MTF 112 may more particularly comprise a plurality of segments (e.g., to illustrate a portion of an MTF 112, a first segment 302 and second segment 304) that together form an MTF 112. For example, and again, to illustrate a portion of an MTF 112, the first segment 302 and the second segment 304 may comprise outer arcing surfaces and inner arcing surfaces that may be joined or sealed, as described herein, to form an outer annular structure 306 and an inner annular structure 308 of an MTF 112. Specifically, the first segment 302 may comprise an outer arcing surface 330a and an inner arcing surface 330b, while the second segment 304 may comprise an outer arcing surface 332a and an inner arcing surface 332b. The inner annular structure 308 may be situated radially inward of the outer annular structure 306.

The MTF 112 may further comprise a plurality of vanes (e.g., 310a and 310b) that extend radially outward from the inner annular structure 308 toward the outer annular structure 306. Each vane may comprise a channel that houses a variety of components (e.g., support struts, hydraulic and electrical equipment, and the like). In various embodiments, any number of vanes may be used in the construction of an MTF 112 (e.g., 9 vanes, 18 vanes, and the like).

In various embodiments, each of the segments (e.g., 302 and 304) comprising the outer annular structure 306 and/or the inner annular structure 308 may comprise a plurality of channels (e.g., 314a, 314b, 314c, 314d, 316a, 316b, 316c, 316d) that extend axially along an axial length each of the segments.

Each segment (e.g., 302 and 304) comprising the outer annular structure 306 and the inner annular structure 308 may include a plurality of tenons that define axial terminuses of each segment 302 and 304. For example, the first segment 302 may include a first and second tenon (e.g., 318a and 318b) that define a first and second outer axial terminus of the first segment 302 and a third and fourth tenon (e.g., 318c and 318d) that define a third and fourth inner axial terminus of the first segment 302.

The same may be true with respect to the second segment 304. For example, the second segment 304 may include a first and second tenon (e.g., 320a and 320b) that define a first and second outer axial terminus of the second segment 304. Likewise, the second segment 304 may include a third and fourth tenon (e.g., 320c and 320d) that define a third and fourth inner axial terminus of the second segment.

Figure 4:
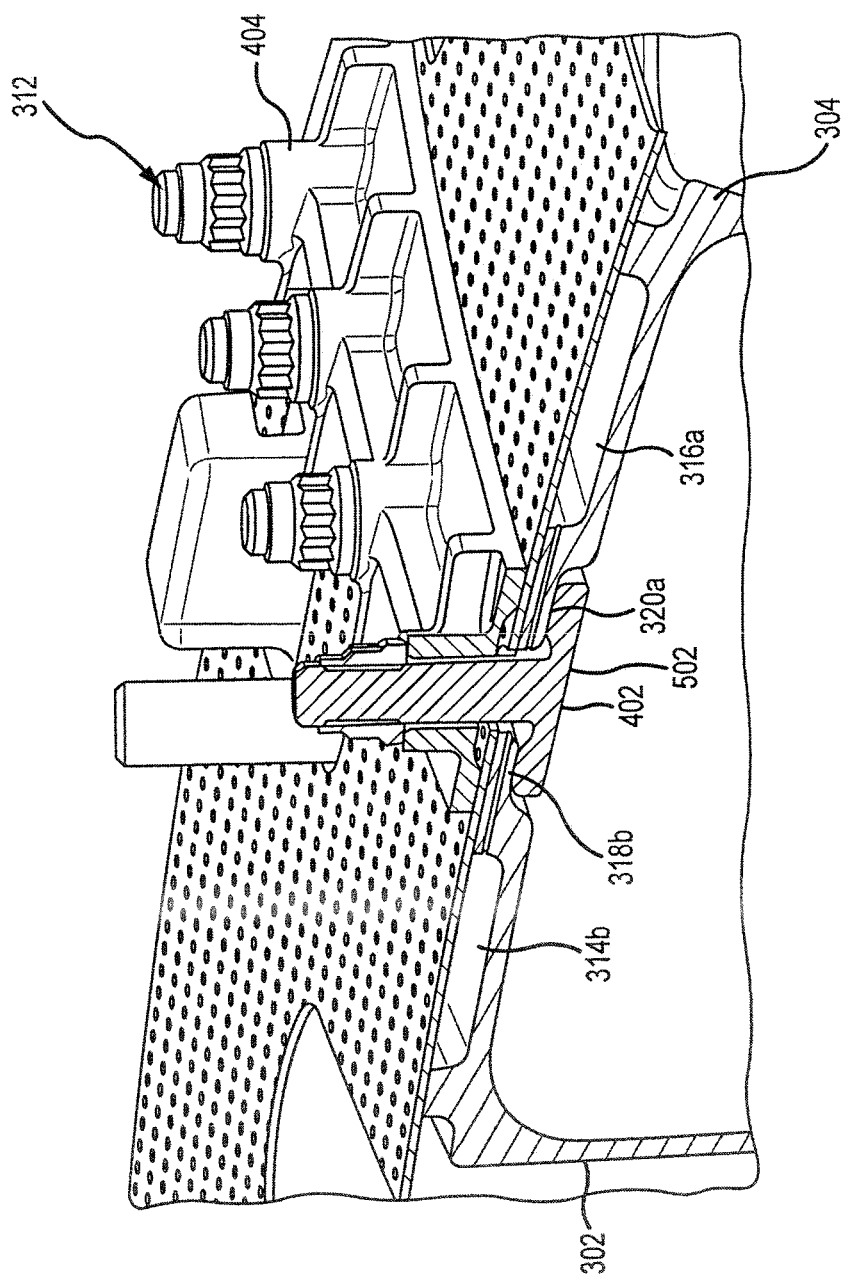
FIG. 4 illustrates, in accordance with various embodiments, a cutaway view of an outer annular structure of an MTF.

In various embodiments, each segment (e.g., 302 and 304) comprising the MTF 112 may be coupled to an adjacent segment by a seal 312 and/or 322. For example, with reference to FIG. 4, the second tenon 318b of the first segment 302 may be coupled by the seal 312 to the first tenon 320a of the second segment 304. The seal 312 may thus couple or clamp the first segment 302 to the second segment 304 to form the outer annular structure 306.

The seal 322 may similarly couple or clamp the fourth tenon 318d of the first segment 302 to the third tenon 320c of the second segment 304. Thus, a plurality of seals (e.g., 312 and 322) may couple a plurality of segments (both with respect to their respective inner annular structures and outer annular structures) to form a substantially annular duct or MTF 112.

Figure 5:
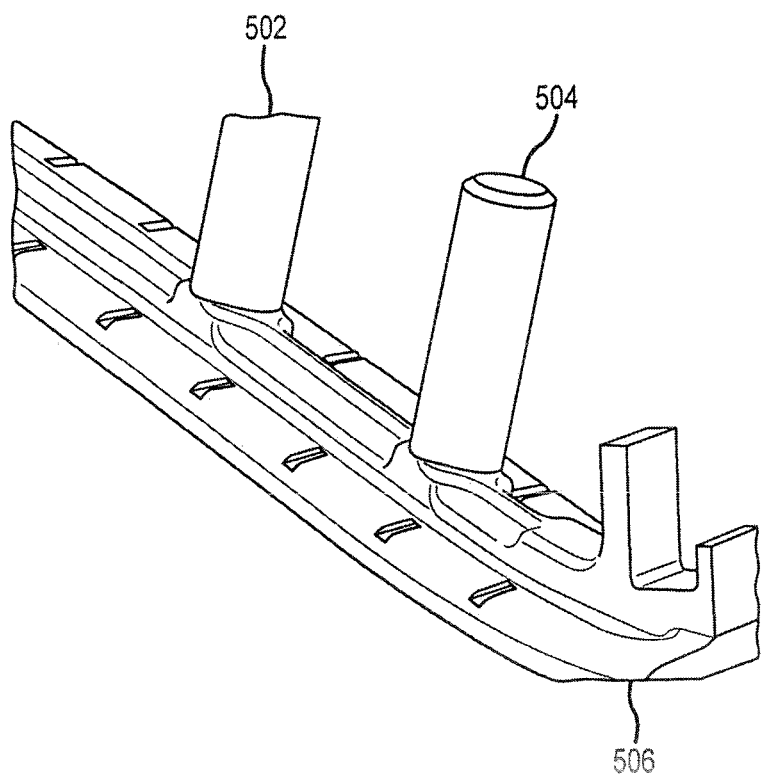
FIG. 5 illustrates, in accordance with various embodiments, a perspective view of a portion of a seal.

A seal 312 (see, e.g., FIG. 4) may comprise a first (male) member 402 and a second (female) member 404. In various embodiments, the first member 402 may comprise a plurality of substantially "T-shaped" elements, for example, element 502 and element 504 (with brief reference to FIG. 5), arranged and coupled axially along an axial member or body 506 (as shown with respect to FIG. 5) while the second member 404 may comprise an axial member configured to receive each of the plurality of the elements (e.g., 502, 504, etc.) For example, as shown with respect to FIG. 4, a T-shaped element 502 may extend radially through the second member 404. Thus, in various embodiments, the second member 404 may comprise a "T-shape" (or two back to back "L-shapes") as well, where the second member 404 receives the first member 402.

Figure 6:
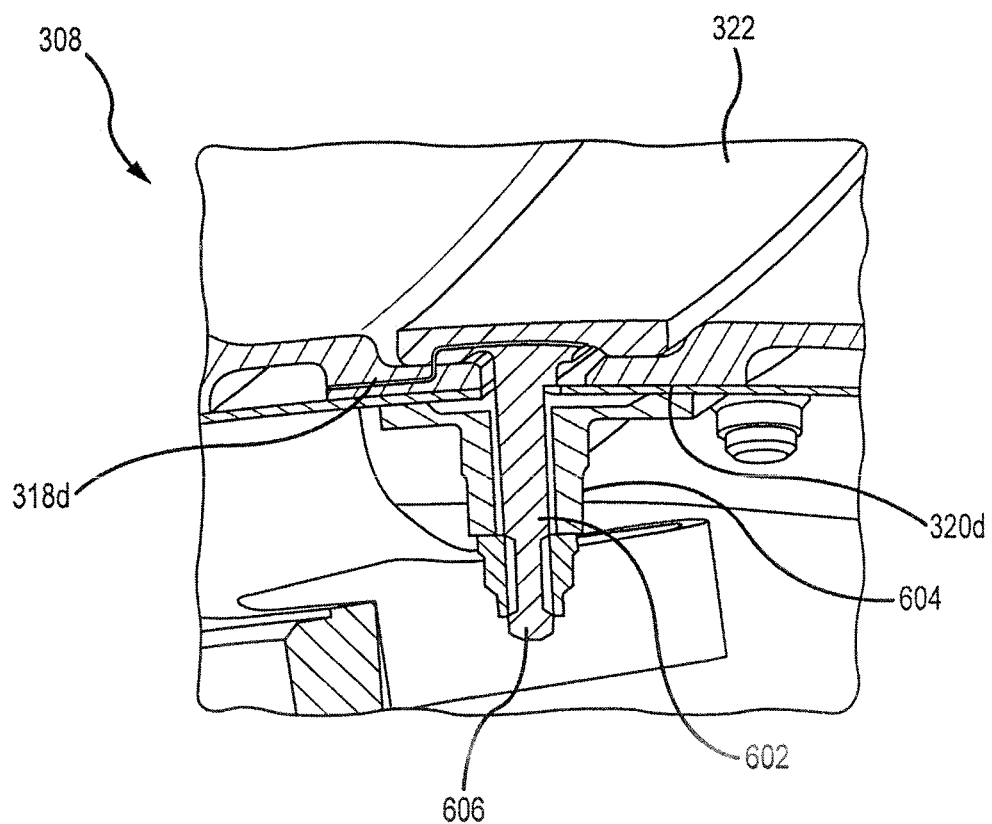
FIG. 6 illustrates, in accordance with various embodiments, a cross-sectional view of an inner annular structure of an MTF.

With reference to FIG. 6, a seal 322 is shown coupling the fourth tenon 318d of the second segment 304 to the fourth tenon 320d of the first segment 302. As discussed above, the seal 322 may comprise a first (male) member 602 and a second (female) member 604. In various embodiments, the first member 602 may comprise a plurality of substantially "T-shaped" elements (e.g., element 606 arranged and coupled axially along an axial member or strut while the second member 604 may comprise an axial member configured to receive each of the plurality of the elements (e.g., 606). For example, a T-shaped element 606 may extend radially through the second member 604. In various embodiments, the second member 604 may comprise a "T-shape" (or two back to back "L-shapes") as well, where the second member 604 receives the an element 606 of the first member 602. In various embodiments, elements 502 and/or 504 and/or member 602 may be threaded, such that an element 502 and/or 504 may, for example, be threaded onto member 602 in a nut and bolt like fashion.

With returning attention to FIG. 3, each of the outer annular structure 306 and/or inner annular structure 308 may be overlaid by (and/or coupled to, via, e.g., the seal 312 and/or 322) to a perforated structure 324 (as shown with respect to the outer annular structure 306). The perforated structure 324 may comprise an arced surface that conforms or substantially conforms to the arc of the inner and/or outer annular structures 306 and/or 308. The perforated structure may further comprise any of a variety of temperature resistant materials and/or alloys, and may comprise primarily sheet metal in nature.

In operation, it may be necessary to cool the equipment, as described above, that passes through the vanes 310a and 310b. As described, these vanes may pass through the MTF 112 duct, through which combustion gasses may flow at high velocity and temperature. Thus, to maintain the integrity of the components within the vanes, cooling may be required.

To achieve this result, cooling air may be pumped in from, for example, an outer portion of the MTF 112, such that it impinges on the perforated structure 324. As this occurs, the air may pass through the perforated structure 324 (due to a difference in pressure) to cool each of the first segment 302 and second segment 304 of the outer annular structure 306.

Figure 7:
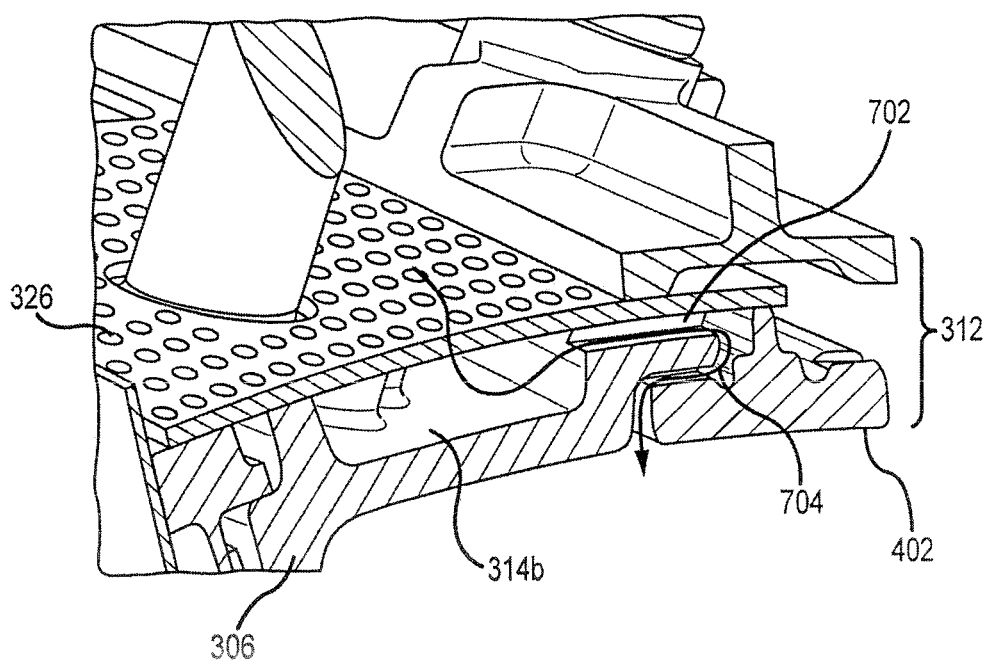
FIG. 7 illustrates, in accordance with various embodiments, a cross-sectional view of an outer annular structure of an MTF, wherein air impinges on a perforated structure to flow through a channel, slot, and/or gutter to reach a duct.

With reference to FIG. 7, as air impinges on the outer annular structure 306, the air may be channeled through the channel 314b (and/or 314a, not shown). The air may be further transferred to the seal 312 by way of a slot 702 formed in each of the first segment 302 and second segment 304 of the outer annular structure 306. These channels 314b (and/or 314a) may help to cool the seal 312 itself, and, in various embodiments, the air may pass through tortuous gutters 704 in the seal 312 to enter to the hot gas flow path within the duct of the MTF 112. In various embodiments, the tortuous gutters 704 may be at least partially formed by a narrow passage that exists between the first male member 402 of the seal 312, the tenon 318a, and the perforated structure 324, which collectively form a passage through which air may flow. Air may further pass through channels formed in the vanes 310a and 310b themselves (not shown) to reach the channels 314c and 314d. Air may be received by the seal 322 (not shown) through a variety of slots, as described above, such that it travels through tortuous gutters in the seal 322 to enter, again, the hot gas flow path of the duct of the MTF 112.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A seal for clamping a first segment of a mid-turbine frame ("MTF") to a second segment of the MTF, the seal comprising:
 a first member configured to be coupled to a radially outward portion of a first segment that forms a portion of an annular structure;
 a second member configured to be coupled to a radially inward portion of the first segment, the second member comprising a plurality of radially extending male fasteners that extend radially outward through the first member, each radially extending male fasteners including a male thread; and
 a plurality of female fasteners, each female fastener in the plurality of female fasteners including a female thread, each female fastener in the plurality of female fasteners corresponding to a respective radially extending male fastener in the plurality of radially extending male fasteners, the plurality of female fasteners and the plurality of radially extending male fasteners configured to clamp the first member therebetween.

2. The seal of claim 1, further comprising a tortuous gutter, the tortuous gutter comprising a narrow passage formed between one of the plurality of radially extending male fasteners, a tenon, and a perforated structure.

3. The seal of claim 1, wherein the seal is configured to permit cooling air to flow into a hot gas path formed within a duct.

4. The seal of claim 2, wherein the tortuous gutter is configured to permit cooling air to flow into a hot gas path formed within a duct.

* * * * *